United States Patent [19]
Allsup et al.

[11] Patent Number: 5,742,442
[45] Date of Patent: Apr. 21, 1998

[54] SAFETY VEHICLE MIRROR VIEWING SYSTEM

[76] Inventors: William Allsup, c/o Tim O'Leary, 17271 McFadden St. #C; Joe Campbell, 14671 Raintree La., both of Tustin, Calif. 92680

[21] Appl. No.: 586,106

[22] Filed: Jan. 16, 1996

[51] Int. Cl.⁶ .......................... G02B 5/08; G02B 7/182; G02B 6/06
[52] U.S. Cl. .......................... 359/839; 359/850; 385/119
[58] Field of Search .......................... 359/839, 854, 359/855, 850; 385/119, 120

[56] References Cited

U.S. PATENT DOCUMENTS

| | | | |
|---|---|---|---|
| 3,501,218 | 3/1970 | Zitzelberger | 385/119 |
| 5,061,035 | 10/1991 | Rogers, Jr. | 385/115 |
| 5,619,370 | 4/1997 | Guinosso | 359/362 |

FOREIGN PATENT DOCUMENTS

| | | | |
|---|---|---|---|
| 0030101 | 3/1981 | Japan | 385/119 |
| 0045234 | 3/1984 | Japan | 385/119 |
| 9107295 | 5/1991 | WIPO | 385/119 |

*Primary Examiner*—Paul M. Dzierzynski
*Assistant Examiner*—Mark A. Robinson

[57] ABSTRACT

A new vehicle mirror viewing system which is designed for rear view mirrors mounted exteriorly of a vehicle and allows a driver to either view the mirror or an image transmitted from the mirror to a viewing screen mounted interiorly of the vehicle. A fiber optic transmission cable is utilized in conjunction with a two-way mirror to transmit the reflected image from the mirror to the viewing screen. The cable utilizes a large bundle of fiber optic cables, and the ends of the cables are mounted in small blocks which allow only small pixels of light to be transmitted from an image passes through the two-way mirror. With the ends of the cables mounted in arrays within transducers, a composite image can be transmitted from a rear surface of the rear view mirror to the viewing screen.

1 Claim, 3 Drawing Sheets

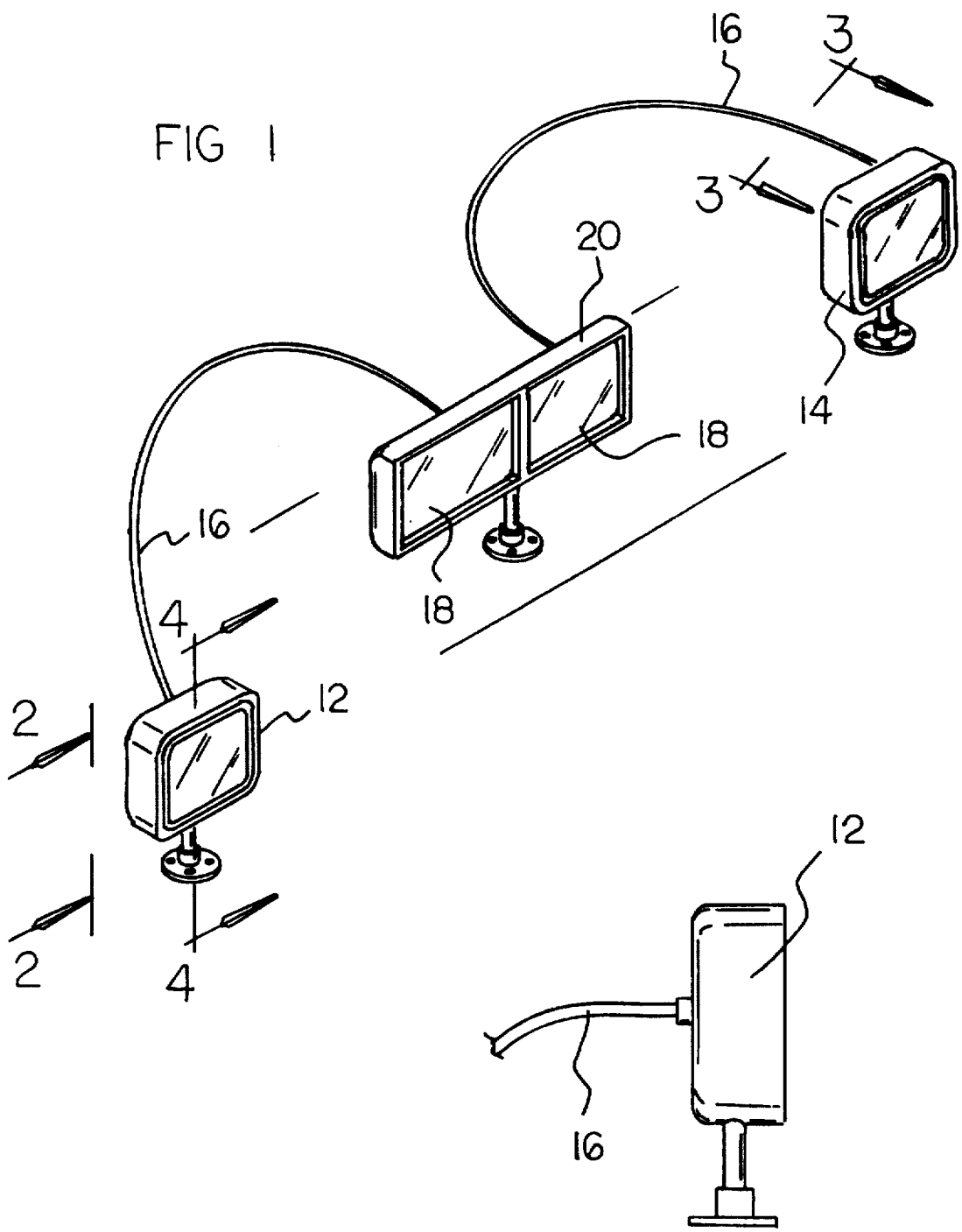

FIG 3
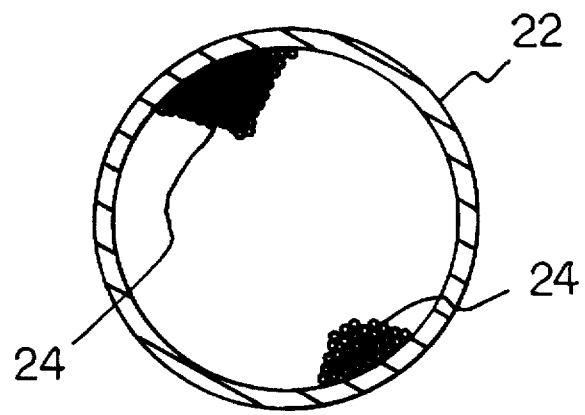
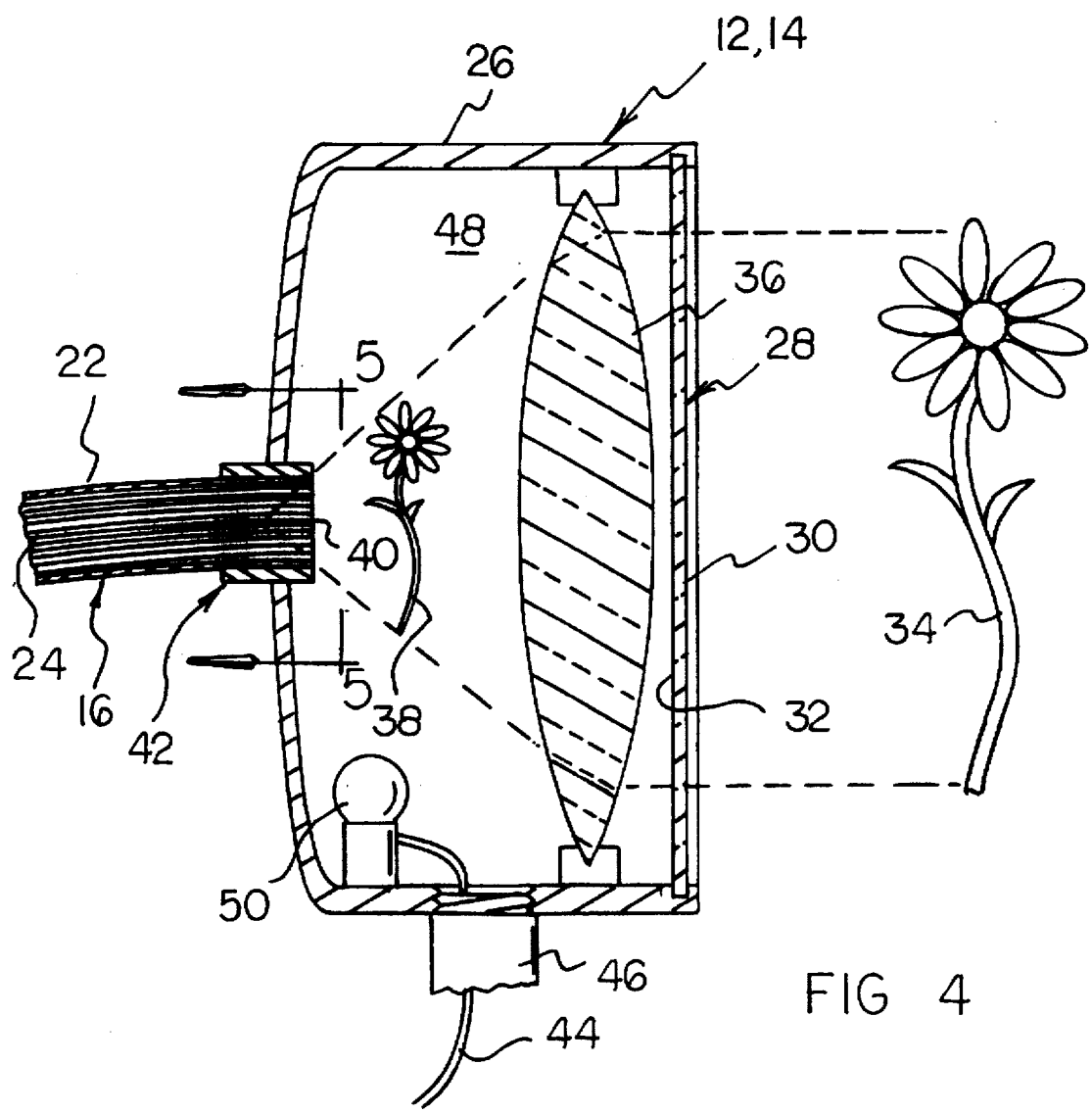
FIG 4

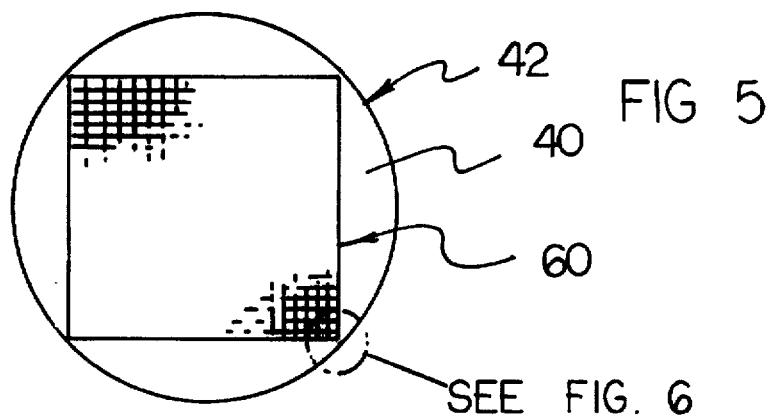
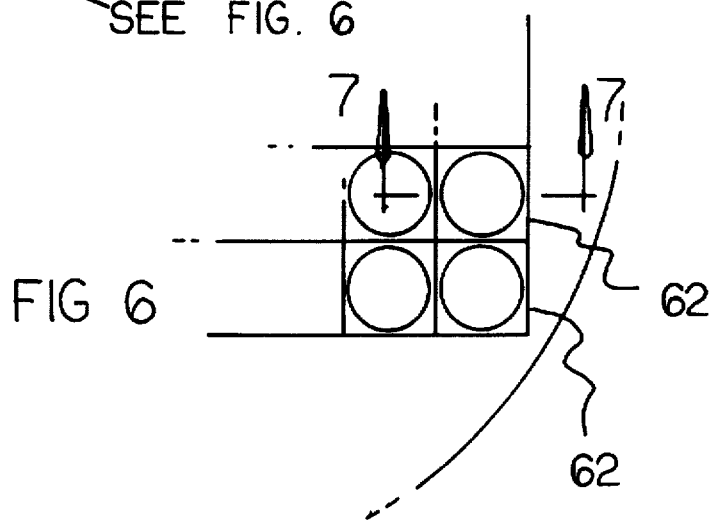
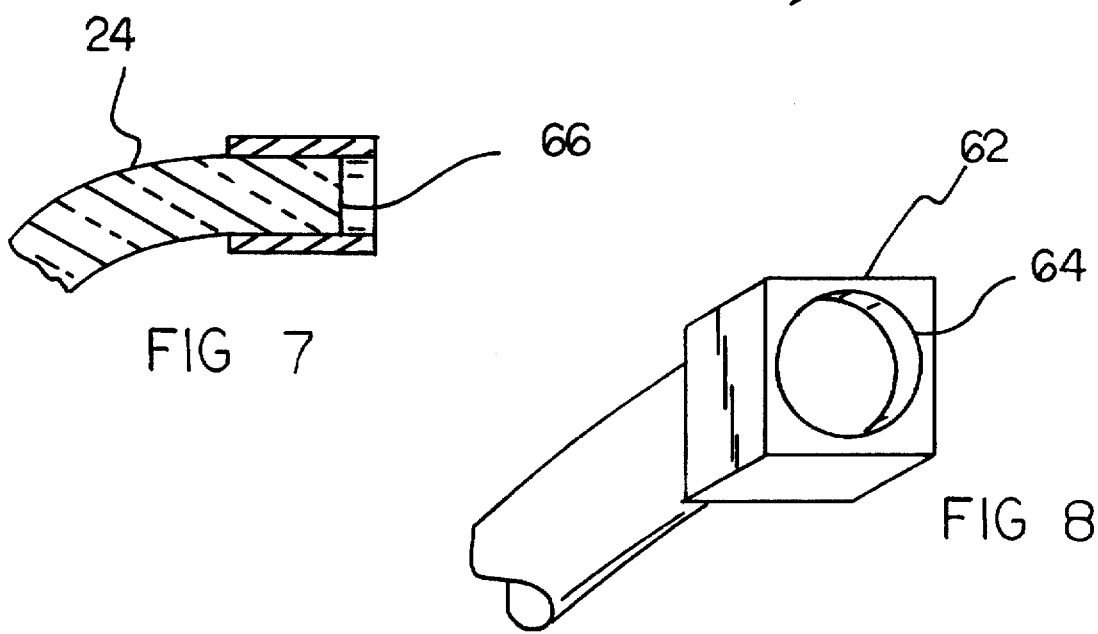

SAFETY VEHICLE MIRROR VIEWING SYSTEM

BACKGROUND OF THE INVENTION

1. Field of the Invention

The present invention relates to vehicle mirrors and more particularly pertains to a vehicle mirror which is designed to transmit its reflected image to a viewing screen mounted interiorly of a vehicle.

2. Description of the Prior Art

The use of rear view mirrors on vehicles is well known in the prior art and typically, modern automobiles utilize at least two such mirrors on opposed sides of the vehicle passenger compartment. The use of two such mirrors presents problems, which include the inability of the driver to view both mirrors simultaneously and further, blind spots in the mirrors require a driver to move his head to awkward positions so as to carefully view the entire area on both sides of a vehicle. With theses safety hazards in mind, it is apparent that there needs to be developed some method of allowing a driver to view the reflected images of two opposed rear view mirror simultaneously. Additionally, there needs to be developed a method of eliminating rear view mirror blind spots and in this respect, the present invention provides a solution to both of these ongoing problems.

SUMMARY OF THE INVENTION

In view of the foregoing disadvantages inherent in the known types of vehicle mirror systems now present in the prior art, the present invention provides a new vehicle mirror system wherein the same can be utilized to allow a driver to view opposed rear view mirrors simultaneously while at the same time eliminating the danger of blind spots in either of the mirrors. As such, the general purpose of the present invention, which will be described subsequently in greater detail, is to provide a vehicle mirror system and method which has many of the advantages of the vehicle mirror systems mentioned heretofore and many additional novel features that result in a vehicle mirror system which is not anticipated, rendered obvious, suggested, or even implied by any of the prior art vehicle mirror systems, either alone or in any combination thereof.

To attain this, the present invention generally comprises a new vehicle mirror viewing system which is designed for rear view mirrors mounted exteriorly of a vehicle and allows a driver to either view the mirror or an image transmitted from the mirror to a viewing screen mounted interiorly of the vehicle. A fiber optic transmission cable is utilized in conjunction with a two-way mirror to transmit the reflected image from the mirror to the viewing screen. The cable utilizes a large bundle of fiber optic cables, and the ends of the cables are mounted in small blocks which allow only small pixels of light to be transmitted from an image passes through the two-way mirror. With the ends of the cables mounted in arrays within transducers, a composite image can be transmitted from a rear surface of the rear view mirror to the viewing screen.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mirror system and method which has many of the advantages of the vehicle mirror systems mentioned heretofore and many novel features that result in a vehicle mirror system which is not anticipated, rendered obvious, suggested, or even implied by any of the prior art vehicle mirror systems, either alone or in any combination thereof.

It is another object of the present invention to provide a new vehicle mirror system which may be easily and efficiently manufactured and marketed.

It is a further object of the present invention to provide a new vehicle mirror system which is of a durable and reliable construction.

An even further object of the present invention is to provide a new vehicle mirror system which is susceptible of a low cost of manufacture with regard to both materials and labor, and which accordingly is then susceptible of low prices of sale to the consuming public, thereby making such vehicle mirror system economically available to the buying public.

Still yet another object of the present invention is to provide a new vehicle mirror system which provides in the apparatuses and methods of the prior art some of the advantages thereof, while simultaneously overcoming some of the disadvantages normally associated therewith.

Still another object of the present invention is to provide a new and improved vehicle mirror system which facilitates the use of a fiber optic transmission cable to transmit images from exteriorly mounted vehicle mirrors to a viewing screen mounted interiorly of the vehicle.

Yet another object of the present invention is to provide a new and improved vehicle mirror system which allows the simultaneous viewing of opposed rear view mirrors while eliminating visibility blind spots in both of such mirrors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a conceptional perspective view of the safety vehicle mirror viewing system comprising the present invention.

FIG. 2 is a cross-sectional view of the invention as viewed along the line 2—2 of FIG. 1.

FIG. 3 is a cross-sectional view of the invention as viewed along the line 3—3 of FIG. 1.

FIG. 4 is a cross-sectional view of the invention as viewed along the line 4—4 of FIG. 1.

FIG. 5 is a cross-sectional view of the invention as viewed along the line 5—5 of FIG. 4.

FIG. 6 is an enlarged detail view taken from FIG. 5 of the drawings.

FIG. 7 is a cross-sectional view as viewed along the line 7—7 of FIG. 6.

FIG. 8 is a perspective view illustrating an end of a fiber optic cable comprising a part of the present invention.

DESCRIPTION OF PREFERRED EMBODIMENTS

With reference now to the drawings, and in particular to FIGS. 1 and 2 thereof, a new vehicle mirror system embodying the principles and concepts of the present invention and generally designated by the reference numeral 10 will be described.

More specifically, it will be noted that the safety vehicle mirror viewing system 10 may, in one embodiment, include a plurality of exteriorly mounted vehicle mirrors 12, 14, such as rear view mirrors or the like, with each of these mirrors having a fiber optic cable assembly, each of which is identical in construction and each of which is generally designed by the reference numeral 16. Each fiber optic cable assembly 16 is in communication with a viewing screen 18, a pair of which are shown mounted in a housing 20 which can be mounted interiorly of a vehicle in a convenient location. When the mirrors 12, 14 comprise a pair a rear view mirrors on a vehicle, they will be mounted on the vehicle on opposed sides of the driver's compartment. Utilizing the present invention, the driver is presented with the option of looking at the reflected images on each of the mirrors 12, 14 in a conventional manner or alternatively, he can see the same images on the pair of viewing screens 18. With the images on the pair of viewing screens 18, he is afforded the opportunity of seeing what both mirrors 12, 14 are reflecting simultaneously. Additionally, the mirrors 12, 14 may be of an elliptical or concave design so as to encompass a complete viewing area on each side of the vehicle, and the image is transmitted through the cables 16 to the pair of viewing screens 18 will then be free of any blind spots.

Each fiber optic cable assembly 16, as shown in FIG. 3, essentially comprises a stainless steel flexible sheath 22 having a plurality of individual fiber optic cables protectively retained therein. Typically, the number of fiber optic cables 24 within a sheath 22 could number into the hundreds whereby each cable would be capable of transmitting a small pixel of light received from a viewable image, with these pixels of light then being combinable on the viewing screen 18 so as to reproduce the reflected images received in the mirrors 12, 14.

The basic concept of the invention is illustrated in FIG. 4. In this regard, it can be seen that each of the mirrors 12, 14 essentially consists of a mirror support housing 26 having two-way mirror 28 mounted therein. As is well known in art, a two-way mirror 28 shows a reflected image form a front surface 30 thereof while allowing enough light from the image to pass through the mirror so as to be viewable from a rear surface 32. Such an image 34, which by way of example is a flower, is shown in FIG. 4 and this image will pass through the two-way mirror 28 so as to be reflected onto a convex focusing lens 36 mounted behind the mirror. The lens 36 concentrates the light from the image 34 and reduces the image to a smaller image 38 which then impinges upon a flat surface 40 of the fiber optic cable assembly 16 as shown. The plurality of fiber optic cables 24 end on the same plan so as to define the flat surface 40, and they are held in a pre-designed and aligned engagement by a transducer head 42.

An electrical supply lead 44 may be mounted in a conventional support post 46 so as to extend upwardly thereto into an interior chamber 48 of the particular rear view mirror 12, 14. The electrical power supply lead is utilized to illuminate a light bulb 50 permanently mounted within the mirrors 12, 14, and this light bulb provides additional illumination to effect a transmission of the reduced image 38 through the fiber optic cable assembly 16.

The viewing screen 18 replaces the two-way mirror 28 at the opposite end of the fiber optic transmission cable 16 whereby the entire viewing screen assembly is substantially identical in appearance to the mirrors 12, 14. The only differences are the illumination of the light bulb 580 and the replacement of the two-way mirror 28 with a conventional viewing screen designed to receive an image from its rear surface. Additionally, with reference again to FIG. 1 of the drawings, it will be noted that both of the viewing screens 18 are recessed into the housing 20 so as to reduce the among abient light which could interfere with the transmitted images from the rear view mirrors 12, 14. A concave lens mounted in the housing 20 receives the transmitted image 38 from the fiber optic viewing cable assembly 16, and enlarges the image wile at the same time focuses it on the viewing screen 18 in a now understood manner.

FIGS. 5, 6, 7 and 8 illustrate the construction of the transducer head 42 with the same construction being utilized at both ends of the fiber optic transmission cable. In this regard, it can be seen that the transducer head 42 is basically of a circular configuration and has a large rectangular member 60 conformingly mounted in a flush with the surface 40. The rectangular member 40 essentially consists of a plurality of small square-shaped blocks 62 formed of opaque material and having circular through-extending apertures 64 mounted therein. An end 66 of each individual fiber optic cable 24 is received within an aperture 64 of a block 62, and these blocks are then arrayed and stacked together in a predetermined and pre-designed manner so as to form the large rectangular member 60. As illustrated in FIGS. 7 and 8, the end 66 of each fiber optic cable 24 is recessed within a block 62, and each block is formed of an opaque material so as to prevent light transmission between the ends of aligned fiber optic cables.

When hundreds of these blocks 62 are arrayed and aligned in the manner to form the large block 60, it can be appreciated that when an image 38 is projected thereon only small sections of the image will be received within each opening 64 in the block 62 so as to impinge upon an end 66 of an individual fiber optic cable 24. Accordingly, each fiber optic cable 24 receives only a small pixel of the image 38, and then transmits that pixel to the second fiber optic connection transducer retained behind the viewing screen 18. When all of the pixels are transmitted through all of the aligned fiber optic cables 24, a composite image is transmitted out of the second fiber optic connection transducer and is then directed onto the second convex lens so as to be enlarged and focused upon the viewing screen 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new vehicle safety mirror system comprising:

at least one mirror support housing mounted on said vehicle, said mirror support housing having a two-way viewing mirror mounted therein, said two-way viewing mirror reflecting a viewable image from a front surface thereof and also permitting said viewable image to pass through said mirror whereby said viewable image is visible from a rear surface thereof;

a fiber optic cable assembly for transmitting said viewable image from said rear surface of said two-way mirror to a remote location;

a remotely positioned viewing screen for receiving said viewable image which is transmitted from said two-way mirror by said fiber optic cable assembly, the viewing screen being recessed into an associated housing to reduce the amount of ambient light that enters the housing;

wherein said mirror support housing includes a first fiber optic connection transducer mounted therein, said first fiber optic connection transducer serving to support an end of said fiber optic cable assembly in an aligned and pre-designed light receiving array, thereby to facilitate a transmission of said viewable image from said rear surface of said two-way viewing mirror to said fiber optic cable assembly, the first fiber optic connection transducer having a circular configuration and a large rectangular member conformingly mounted flush with a flat surface defined by the end of the fiber optic cable assembly;

wherein said fiber optic cable assembly includes a plurality of juxtaposed independent fiber optic cables, each of which can transmit a section of said viewable image to said viewing screen;

wherein a first convex lens is positioned interiorly of said mirror support housing between said rear surface of said two-way viewing mirror and said first fiber optic connection transducer, said convex lens serving to reduce and focus said viewable image over a flat light receiving surface of said first fiber optic connection transducer, thereby to provide each of said fiber optic cables with a section of said viewable image for transmission to said viewing screen;

a second fiber optic connection transducer mounted proximate said viewing screen, said second fiber optic connection transducer delivering said viewable image to a second convex lens mounted within a second housing containing said viewing screen, said second convex lens being positioned between said second fiber optic connection transducer and said viewing screen, said second convex lens serving to enlarge and focus said viewable image on said viewing screen; and illumination means mounted in said mirror support housing, said illumination means providing an enhanced lighting effect to improve said transmission of said viewable image through said fiber optic cable assembly, the illumination means including an electrical supply lead extending upwardly into an interior chamber of the mirror support housing and connected to a light bulb;

wherein ends of each fiber optic cable contained in said first fiber optic connection transducer are each mounted in a small rectangularly-shaped block of opaque material, said ends being recessed in each such block so that only a pixel of said viewable image is transmitted to each fiber optic end, an end of each fiber optic cable being received within an aperture of the associated block and the blocks being arrayed and stacked together to form the large rectangular member;

wherein opposed ends of each fiber optic cable contained in said second fiber optic connection transducer are each mounted in a small rectangularly-shaped block of opaque material, said opposed ends being recessed in each such block so that only a pixel of said viewable image is transmitted from each fiber optic end to said second convex lens;

wherein said mirror support housing comprises a rear view mirror mounted exteriorly of said vehicle;

wherein a second housing contains at least a second viewing screen, said second viewing screen being connectible to a second two-way mirror by means of a second fiber optic cable assembly, said second two-way mirror being mounted at a different location on said vehicle.

\* \* \* \* \*

UNITED STATES PATENT AND TRADEMARK OFFICE
CERTIFICATE OF CORRECTION

PATENT NO : 5,742,442
DATED : April 21, 1998
INVENTOR(S): Allsup and Campbell

It is certified that error appears in the above-identified patent and that said Letters Patent are hereby corrected as shown below:

On the title page, item, [76], first-named inventor's address, please delete "c/o Tim O'Leary". Second-named inventor's address, please delete "La." and insert therefor --Ln.--

Signed and Sealed this

First Day of September, 1998

Attest:

BRUCE LEHMAN

Attesting Officer

Commissioner of Patents and Trademarks